May 5, 1931. F. WINKLER 1,804,296
PROCESS AND APPARATUS FOR THE SHAPING OF LUMPS OF DOUGH
Filed March 1, 1929 3 Sheets-Sheet 1

INVENTOR:
FRIDOLIN WINKLER.

BY Sturtevant & Mason
ATTORNEYS.

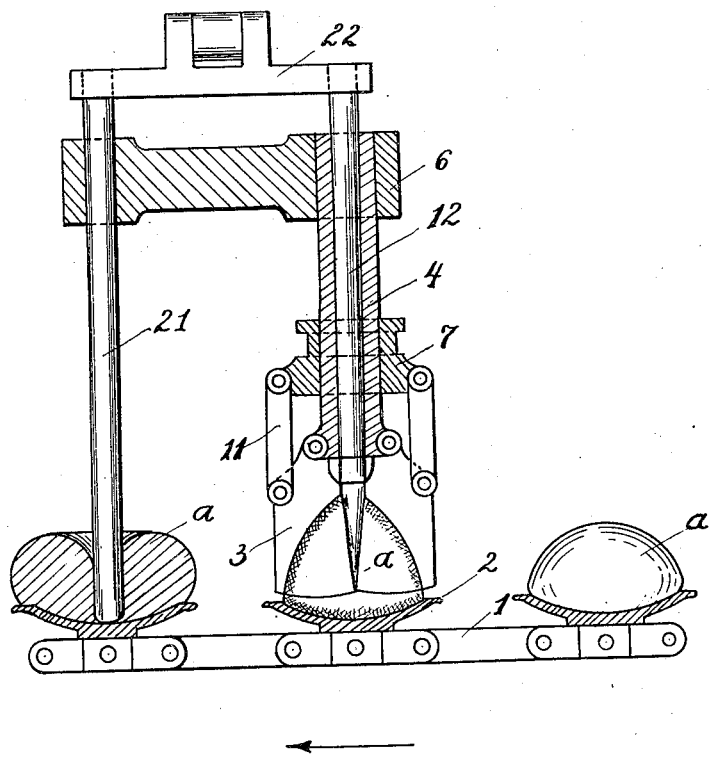

Patented May 5, 1931

1,804,296

UNITED STATES PATENT OFFICE

FRIDOLIN WINKLER, OF VILLINGEN, GERMANY

PROCESS AND APPARATUS FOR THE SHAPING OF LUMPS OF DOUGH

Application filed March 1, 1929, Serial No. 343,696, and in Germany March 1, 1928.

The invention relates to the shaping of lumps of dough for the preparation of baker's wares, and one purpose of the invention resides in providing the surface of such lumps of dough with incisions, whereby the upper part of each lump is divided into separate flaps, causing the individual flaps of dough to overlap each other in part, and depressing the points of the flaps of dough, which meet at the centre of the upper surface, so as to impart a strain to the shaped dough which consequently retains the correct form when the dough rises and during the final baking.

For this purpose and according to the invention a number of curved knives of helical form are caused to penetrate the lump of dough from the sides, whereby the dough is given a plurality of incisions. Subsequently a vertical plunger is pressed into the lump of dough from above and imparts a strain to it. Preferably the plunger is simultaneously rotated, in order to increase the strain.

An arrangement for performing this work comprises, according to the invention, a number of pivotally mounted knives with curved blades of helical form, means for bringing the knives together concentrically above the operating point and for withdrawing them, means for feeding the lumps of dough consecutively to the operating point, and means for simultaneously depressing and rotating the centre of the lump of dough after it has been cut by the knives.

An intermittently moving endless chain with cups for carrying the individual lumps of dough may, according to the invention, serve as means for feeding the dough to the operating point.

A suitably mounted plunger, adapted to be displaced vertically and to rotate, may be used to depress and rotate the centre of the incised lumps. The vertical plunger advantageously has a blunt end furnished with teeth in order better to engage the flaps of dough during the depression and twisting.

Figure 1:
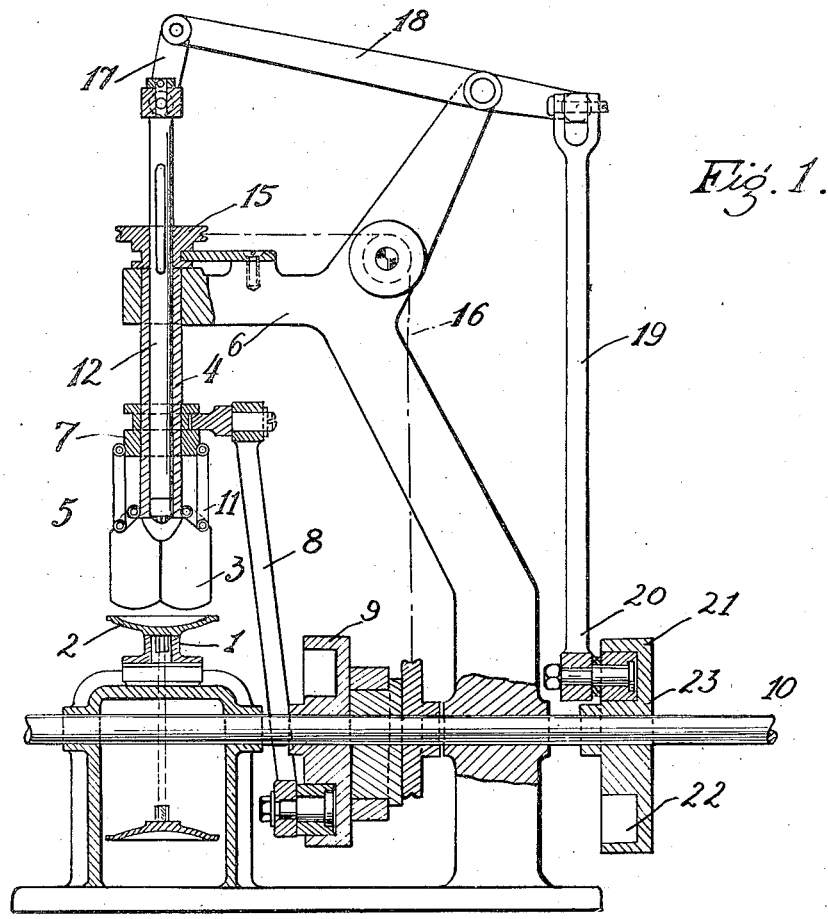
Figure 1A:
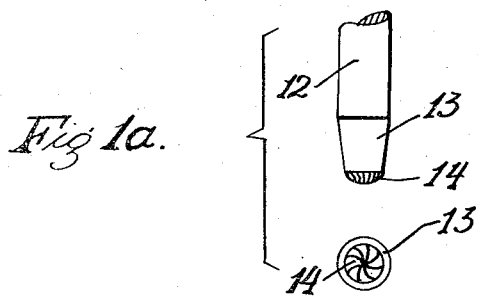
Figure 6:
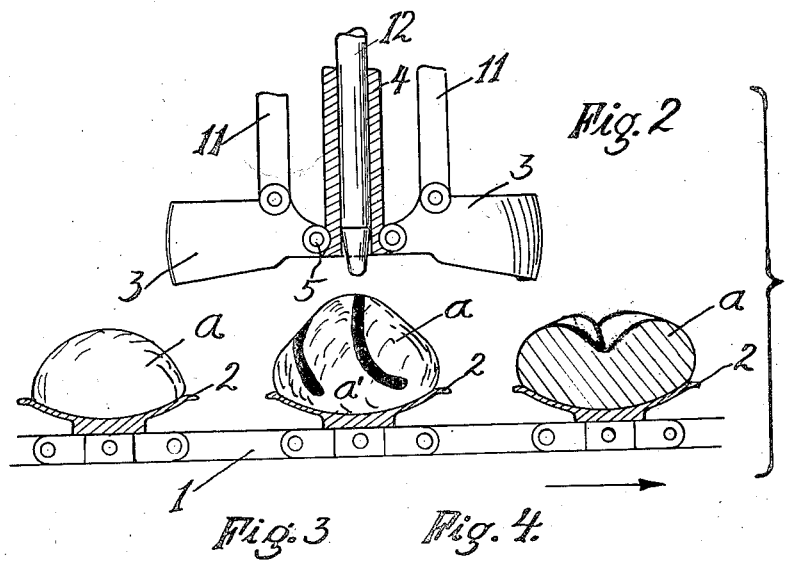
Figure 7:
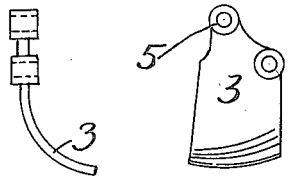
Figure 8:
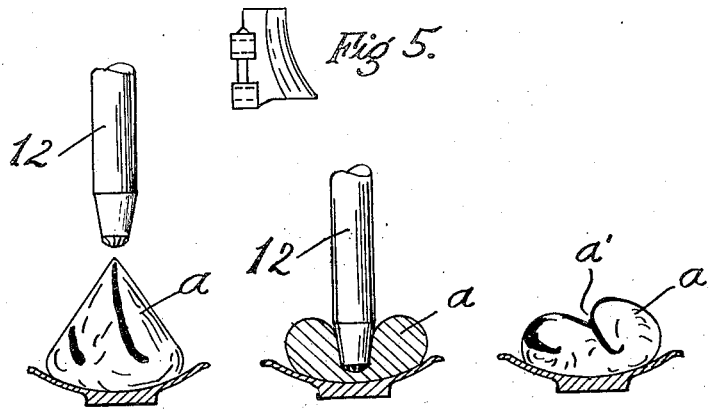

Two embodiments of the apparatus according to the invention are illustrated in the accompanying drawings, in which Fig. 1 shows a central vertical section of one embodiment, Fig. 1a illustrates on a larger scale the end of the plunger as seen from the side and from below, Fig. 2 is a part of the shaping device with the knife blades withdrawn, Figs. 3, 4 and 5 show a single knife blade as seen from the front, side and from above respectively; Figs. 6, 7 and 8 show three stages in the shaping process, namely before, during and after the operation of the plunger. Fig. 9 represents a second embodiment in partial section, corresponding to a view from the left of Fig. 1. The object of both embodiments is a mechanical method for shaping certain pieces of dough, especially for rolls and fancy rolls, an operation which has previously been performed by hand. The operation is as follows; first flaps are formed in a ball of dough by means of incisions of helical form, the points of the flaps of dough meeting at the middle of the upper surface of the ball. These flaps must then be so twisted relative to each other that they lie partly one on top of the other, and finally the centre of the lump of dough must be pressed downwardly from above. By this pressure the surface strain in the dough, which has been to a certain extent released by the cutting, is reimposed; this strain is necessary if the shaped pieces of dough are to retain their pleasing form when they rise and during the final baking.

In the embodiment as illustrated in Figs. 1-8 an endless chain 1 with individual cups 2 serves to carry and forward the balls of dough, the arrangement being given an intermittent motion so that consecutive cups are presented in turn to the shaping device. This device comprises a number of knives 3, for example four, with curved blades of a helical form (as indicated in Figs. 3-5), that is, each of these blades extends downward from its pivot axis 5, at first as a plane, and then is progressively bent toward the side (Fig. 3), being curved so that its surface is warped (Fig. 5), and thereby operates upon the lump of dough to cut the same along a respective helical line (Figs. 2 and 6). These knives are pivoted on horizontal axes 5 on the periphery of a tubular sheath 4 which is secured in an arm 6 of the framework of the machine. The sheath 4 carries a sliding collar 7 which is slid up and down in timed relation to the operation of the machine by means of a thrust-rod 8 carried by an oscillating lever provided with a roller engaging with a cam-groove in a disc 9 mounted on the main shaft 10. The blades of the knives 3 are connected to the collar 7 by means of links 11 in such manner that when the collar 7 is raised the blades are withdrawn or swung outwardly until they reach the position shown in Fig. 2.

This Fig. 2 shows three cups in the machine, and illustrates three different stages of working a lump of dough. In the left hand cup 2, the lump of dough $a$ has not yet been shaped. As the chain 1 moves this cup into the central position, and the knives 3 are caused to operate, the lump is brought into a conical shape as illustrated in this central position in Fig. 2, or in Fig. 6. In this central position, further, the knives 3 have already been withdrawn from the lump. While still in the central position of Fig. 2, the plunger 12 is caused to move downward (Fig. 7) while rotating. The plunger is then withdrawn, and thereafter the chain is advanced again. This produces the product comprising the shaped lump of dough as shown in cross section in the right hand cup 2 of Fig. 2, and in elevation in Fig. 8.

From this position, due to downward motion of the collar 7, they are brought together into the position shown in Fig. 1, and thus penetrate into the ball of dough $a$ which is in position beneath them. Consequently this dough is given four curved incisions $a'$ of helical form.

A plunger 12 is arranged to be moved vertically up and down within the sheath 4, the blunt end 13 of the plunger 12 is furnished with helically formed teeth 14. A double motion is imparted to the plunger 12. In the first place it is maintained in constant rotation by means of a splined pulley 15 operated by a belt from the main shaft 10. The upper end of the plunger is connected to the lever 18 by means of a link 17. The lever 18 is oscillated up and down by means of a thrust rod 19 carried by a lever 20 furnished with a roller 21 co-operating with a cam-groove 22 in a disc 23 mounted on the main shaft. Consequently the plunger is raised and depressed once during each rotation of the main shaft 10. The motions are so timed that, at the instant when the knives 3 have cut the ball of dough and open to the position shown in Fig. 2, the plunger 12 moves downwardly and depresses the centre of the dough. In so doing it engages the points of the flaps of dough formed by the incisions and draws these one over the other so that in part they overlap spirally. The plunger passes through the ball of dough almost to the bottom of the cup 2, so that a considerable strain is imparted to the dough. When the dough rises the depressed centre of the ball of dough also rises to such an extent that the desired shape of the final products results. It is obvious that on account of the internal stress, the dough closes itself almost completely in the center of the lump.

In the embodiment as illustrated in Fig. 9 the plunger 12′ is provided with a sharp point and is given only a vertical reciprocatory motion. It penetrates simultaneously with the knives, into the ball of dough and prevents the upward escape of the dough.

The depression of the flaps of dough formed by the incisions, is effected by a second plunger 21 which is connected to the plunger 12′, by a cross-head 22, and thus descends simultaneously therewith.

By the next advance of the endless chain carrying the cups, the ball of dough which has been cut is brought under the plunger 21, where the centre is depressed.

In other respects the embodiment according to Fig. 9 is analogous with the first embodiment described.

Claims:

1. A process for shaping lumps of dough and like articles, comprising the cutting of a lump of dough and forming it into a substantially conical shape, the lines of the cuts extending helically from the apex of the shape, and thereafter compressing the cone of dough in the direction of its axis.

2. A process as in claim 1, including the step of rotating the lump of dough at the center of the upper portion of the lump with respect to its base during the compressing operation.

3. An apparatus for shaping lumps of dough and like material comprising a plurality of pivotally mounted knives having curved blades of helical shape, means for presenting a lump of dough opposite said knives, means for moving the knives pivotally to bring them together toward an axis whereby to cut the dough and for thereafter withdrawing the knives, a plunger member, and means for operating the plunger member upon the withdrawal of the knives to compress the lump of dough along the line of said axis.

4. Apparatus as in claim 3, including means to rotate said plunger during its compressing movement.

5. In an apparatus for shaping lumps of dough and like material comprising a plurality of cups each adapted to receive a lump of dough, means to intermittently move the individual cups into and from a predetermined position, a plurality of knives mounted on horizontal pivots above said position, means to move said knives downwardly and inwardly about their respective pivots while a cup is momentarily stationary thereunder and to withdraw the said knives therefrom, a plunger movable vertically downwardly axially of said cup while in such position, and means to move said plunger downward to compress a lump of dough upon the respective cup upon the withdrawal of said knives therefrom.

6. An apparatus for shaping lumps of dough and like material comprising means to support a lump, a plurality of knives mounted on fixed horizontal axes above said means, means to rock said knives downwardly and toward one another whereby to cut into the lump and form it into a substantially conical shape, and to withdraw said knives therefrom, a plunger mounted for axial movement between the axes of the knives, and means to force said plunger downward to compress said lump at the center of the upper portion thereof.

7. An apparatus for shaping lumps of dough and like materials comprising a plurality of knives mounted on horizontal pivots, means for moving the knives simultaneously whereby to cut into the lump and for withdrawing the knives therefrom, a plunger having a blunt point with teeth thereon, means for moving said plunger vertically downward onto said lump whereby to compress the same, and means to rotate said plunger during said compression.

8. A process for shaping lumps of dough and like materials which comprises cutting into a substantially symmetrical lump of dough from the sides thereof whereby to form it substantially into a cone comprising flaps of dough ending in points at the apex of the cone, and thereafter compressing the flaps along the axis of the cone.

9. A process as in claim 8, in which a plurality of cuts are made simultaneously, and the compression is accompanied by a rotation of the center of the upper portion of the lump with respect to its base.

10. A process for shaping lumps of dough and like material comprising producing a lump of dough having a plurality of integral flaps lying in helical form one upon another, and substantially symmetrically arranged with respect to a central axis, and thereupon compressing the center of the lump in the direction of such axis.

11. A process for shaping lumps of dough and like materials which comprises cutting into the lump from the sides thereof thus forming it substantially into a cone comprising flaps of dough ending in points at the apex of the cone, and thereafter compressing the flaps along the axis of the cone.

In testimony whereof I have signed my name to this specification.

FRIDOLIN WINKLER.